(12) United States Patent
Uchibori

(10) Patent No.: US 10,769,251 B2
(45) Date of Patent: Sep. 8, 2020

(54) INFORMATION PROCESSING SYSTEM, INFORMATION PROCESSING APPARATUS AND INFORMATION PROCESSING METHOD

(71) Applicant: Hiroki Uchibori, Tokyo (JP)

(72) Inventor: Hiroki Uchibori, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 185 days.

(21) Appl. No.: 16/115,981

(22) Filed: Aug. 29, 2018

(65) Prior Publication Data

US 2019/0095594 A1 Mar. 28, 2019

(30) Foreign Application Priority Data

Sep. 25, 2017 (JP) ................................. 2017-184188

(51) Int. Cl.
| | | |
|---|---|---|
| *H04L 29/06* | (2006.01) | |
| *G06F 21/12* | (2013.01) | |
| *G06F 9/50* | (2006.01) | |
| *G06F 21/31* | (2013.01) | |

(52) U.S. Cl.
CPC .......... *G06F 21/128* (2013.01); *G06F 9/5005* (2013.01); *G06F 21/31* (2013.01)

(58) Field of Classification Search
CPC ........ G06F 21/10; G06F 21/105; G06F 21/12; G06F 21/121; G06F 21/128; G06F 9/5005; G06F 21/31; G06F 21/60; G06F 21/604; G06F 21/62; G06F 21/6209; G06F 21/6218; H04L 63/10; H04L 63/102; H04L 63/104; H04L 63/108

See application file for complete search history.

(56) References Cited

U.S. PATENT DOCUMENTS

| | | | | |
|---|---|---|---|---|
| 9,037,714 | B2 * | 5/2015 | Belchee | ................ G06F 21/105 709/203 |
| 9,635,015 | B1 * | 4/2017 | Panayotopoulos | ... G06F 16/955 |
| 10,015,236 | B2 * | 7/2018 | Hong | .................... G06F 21/121 |
| 2002/0188736 | A1 * | 12/2002 | Jarvensivu | .............. H04L 63/10 709/229 |

(Continued)

FOREIGN PATENT DOCUMENTS

| | | |
|---|---|---|
| JP | 2015-095051 | 5/2015 |
| JP | 2016-143423 | 8/2016 |

*Primary Examiner* — Malcolm Cribbs
(74) *Attorney, Agent, or Firm* — Harness, Dickey & Pierce, P.L.C.

(57) ABSTRACT

An information processing system, apparatus, and method are disclosed each of which: receives a request for using an application from an electronic device via a network; determines whether the requested application is applicable to the electronic device and is currently useable by the electronic device; determines whether a number of devices currently using the requested application has reached an upper limit number that is previously set, when the determining determines that the requested application is applicable to the electronic device but is not currently useable by the electronic device; and allows the electronic device to use the requested application, when the determining determines that a number of devices using the requested application has not reached the upper limit number.

10 Claims, 18 Drawing Sheets

(56) References Cited

U.S. PATENT DOCUMENTS

| | | | |
|---|---|---|---|
| 2004/0160911 A1* | 8/2004 | Zilliacus | G06F 21/10 370/328 |
| 2008/0148363 A1* | 6/2008 | Gilder | G06F 21/10 726/4 |
| 2011/0191859 A1* | 8/2011 | Naslund | H04N 21/8355 726/27 |
| 2012/0127525 A1 | 5/2012 | Uchibori et al. | |
| 2012/0127527 A1 | 5/2012 | Nakabayashi et al. | |
| 2013/0063761 A1 | 3/2013 | Uchibori et al. | |
| 2013/0314732 A1 | 11/2013 | Nakabayashi et al. | |
| 2014/0237625 A1* | 8/2014 | Zatsepin | G06F 21/105 726/28 |
| 2016/0098546 A1* | 4/2016 | Maurer | G06F 21/10 726/28 |
| 2016/0226952 A1 | 8/2016 | Hong | |
| 2016/0314447 A1* | 10/2016 | Trevathan | G06F 21/105 |
| 2017/0024548 A1* | 1/2017 | Dorwin | G06F 21/10 |
| 2017/0041794 A1* | 2/2017 | Lee | H04W 12/08 |
| 2017/0200169 A1* | 7/2017 | Yuki | G06F 21/10 |
| 2017/0269917 A1* | 9/2017 | Matsushima | H04N 1/00474 |
| 2017/0272597 A1* | 9/2017 | Han | G06F 21/10 |
| 2018/0109688 A1 | 4/2018 | Uchibori et al. | |
| 2018/0225079 A1* | 8/2018 | Kotteri | H04L 65/605 |

* cited by examiner

FIG. 6

| PACKAGE ID | PACKAGE NAME | DESCRIPTION OF PACKAGE | SERVICE ID | APPLICATION ID LIST | ... |
|---|---|---|---|---|---|
| P001 | STORAGE A PACKAGE | ... | S11111 | APP001,APP002,... | ... |
| P002 | STORAGE B PACKAGE | ... | S22222 | APP101,APP102,... | ... |
| P002 | STORAGE C PACKAGE | ... | S33333 | APP201,APP202,... | ... |
| ... | ... | ... | ... | ... | ... |

110

PACKAGE INFORMATION

FIG. 7

| APPLICATION ID | APPLICATION NAME | DESCRIPTION OF APPLICATION | CREATION DATE | DEVELOPER INFORMATION | ... |
|---|---|---|---|---|---|
| APP001 | Scan to Email | ... | APRIL 5, 2017 | AA | ... |
| APP002 | Scan to Me | ... | APRIL 5, 2017 | AA | ... |
| APP003 | Scan to Storage A | ... | APRIL 5, 2017 | AA | ... |
| ... | ... | ... | ... | ... | ... |

Columns "DESCRIPTION OF APPLICATION", "CREATION DATE", and "DEVELOPER INFORMATION" are grouped as APPLICATION INFORMATION.

| APPLICATION SETTING ID | APPLICATION ID | DEFAULT SETTING | APPLICATION SETTING INFORMATION |
|---|---|---|---|
| SET001 | APP001 | RESOLUTION = 300dpi, ... | ... |
| SET002 | APP002 | ... | ... |
| SET003 | APP003 | ... | ... |
| ... | ... | ... | ... |

| SERVICE ID | SERVICE NAME | DESCRIPTION OF SERVICE | SERVICE TYPE | ... |
|---|---|---|---|---|
| S11111 | STORAGE A LINKED SERVICE | ... | CLOUD SERVICE | ... |
| S22222 | STORAGE B LINKED SERVICE | ... | CLOUD SERVICE | ... |
| S33333 | STORAGE C LINKED SERVICE | ... | CLOUD SERVICE | ... |
| ... | ... | ... | ... | ... |

140

SERVICE INFORMATION: { DESCRIPTION OF SERVICE, SERVICE TYPE, ... }

FIG. 10

| LICENSE ID | LICENSE NAME | USE START DATE | SCHEDULED TERMINATION DATE | TERMINATED DATE | STATUS | NUMBER OF DEVICE USABLE OF APPLICATION | ID OF DEVICE IN USE | SERVICE ID | |
|---|---|---|---|---|---|---|---|---|---|
| L12345 | AA LICENSE | AUGUST 8, 2017 | AUGUST 7, 2018 | | IN USE | 10 | D001,D003 | S11111 | ... |
| L12346 | BB LICENSE | JULY 15, 2016 | JULY 14, 2017 | JULY 14, 2017 | TERMINATED | — | — | S22222 | ... |
| L12347 | BB LICENSE | JULY 15, 2017 | JULY 14, 2018 | | IN USE | 15 | D101,D102,... | S22222 | ... |
| ... | ... | ... | ... | ... | ... | ... | ... | ... | ... |

150  
LICENSE INFORMATION

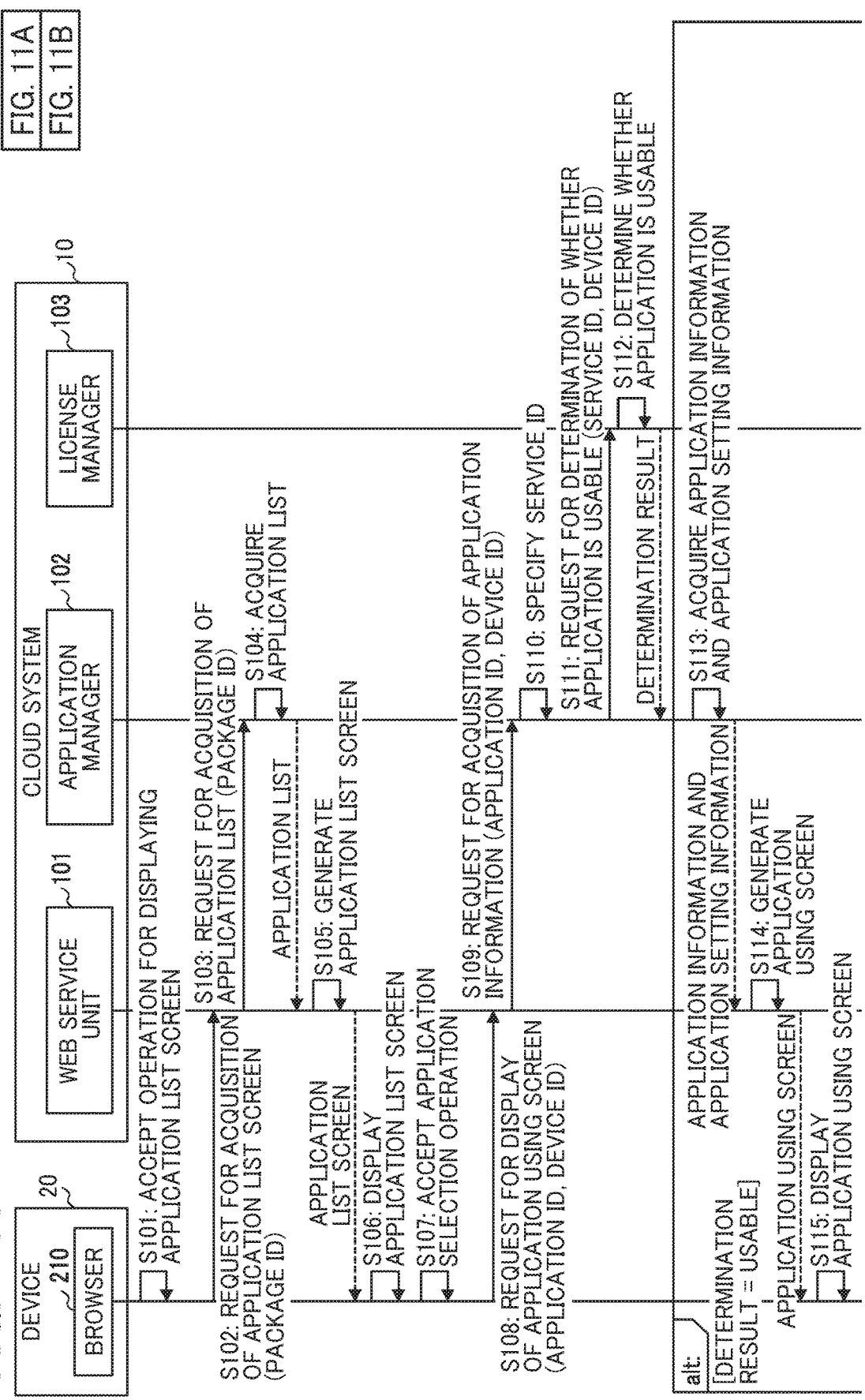

Number of device usable of application reached the upper limit.
Application is not available. Please contact the administrator.

| USER ID | AUTHORITY |
|---|---|
| U001 | ADMINISTRATOR AUTHORITY |
| U002 | GENERAL AUTHORITY |
| U003 | GENERAL AUTHORITY |
| ... | ... |

160

AUTHORIZATION INFORMATION (U001, ADMINISTRATOR AUTHORITY)

INFORMATION PROCESSING SYSTEM, INFORMATION PROCESSING APPARATUS AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2017-184188, filed on Sep. 25, 2017, in the Japan Patent Office, the entire disclosure of which is hereby incorporated by reference herein.

BACKGROUND

Technical Field

The present invention relates to an information processing system, an information processing apparatus, and an information processing method.

Description of the Related Art

In recent years, with advances in technologies such as cloud computing, various kinds of applications have been provided as a cloud service to a device such as a multifunction peripheral (MFP). For example, as the cloud service, an application that stores image data, which is generated by scanning a document with the MFP, in an external memory, or an application that causes the MFP to print an image based on the image data that is downloaded from the external memory may be provided.

Further, use of such applications provided as the cloud service may be centrally managed, for example, based on whether a device can be installed with a license to use the application, or whether a device has been installed with the license to use the application.

SUMMARY

Example embodiments of the present invention include an information processing system, apparatus, and method each of which: receives a request for using an application from an electronic device via a network; determines whether the requested application is applicable to the electronic device and is currently useable by the electronic device; determines whether a number of devices currently using the requested application has reached an upper limit number that is previously set, when the determining determines that the requested application is applicable to the electronic device but is not currently useable by the electronic device; and allows the electronic device to use the requested application, when the determining determines that a number of devices using the requested application has not reached the upper limit number.

Example embodiments of the present invention include a non-transitory recording medium storing a control program for performing the above-described information processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is a diagram illustrating one example of package information;

FIG. 7 is a diagram illustrating one example of application information;

FIG. 8 is a diagram illustrating one example of application setting information;

FIG. 9 is a diagram illustrating one example of service information;

FIG. 10 is a diagram illustrating one example of license information;

FIGS. 11A and 11B (FIG. 11) are a sequence diagram illustrating one example of a process for starting use of an application according to the first embodiment;

FIG. 15 is a diagram illustrating one example of an error screen;

FIG. 17 is a diagram illustrating one example of authorization information; and

Figure 1:
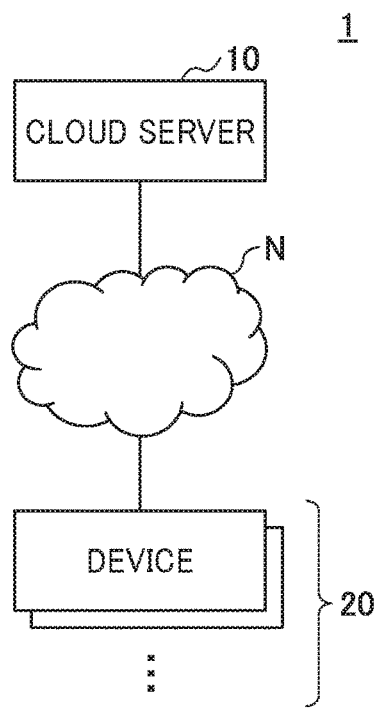
FIG. 1 is a diagram illustrating one example of a configuration of a cloud system according to the first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an embodiment of the present invention will be described in detail with reference to the drawings.

First Embodiment

Overall Configuration

First, an overall configuration of a cloud system 1 will be described with reference to FIG. 1. FIG. 1 is a diagram illustrating one example of the overall configuration of the cloud system 1 according to the present embodiment.

As illustrated in FIG. 1, the cloud system 1 according to the present embodiment includes a cloud server 10 and one or more electronic devices 20 (collectively referred to as the device 20). The cloud server 10 and the device 20 are communicably connected with each other via a wide area network N such as the Internet.

The cloud server 10 is an information processing apparatus (computer) that provides a cloud type application to the device 20 via the network N. Hereinafter, the cloud type application is referred to as "cloud application" or also simply as "application".

Specific examples of the cloud application can include, an application that causes image data scanned by the device 20 such as an MFP be stored in an external memory, and an application that causes the device 20 to print an image based on the image data obtained from the external memory.

The application provided by the cloud server 10 is described as being a cloud type application, but not limited to this. The application provided by the cloud server 10 may be, for example, a Web application or an application provided by an ASP (Application Service Provider).

In addition, the cloud server 10 manages an application license or the like to be provided to the device 20. That is, the cloud server 10 manages information on the device 20 usable of the application, information on a maximum number of the device 20 usable of the application, and the like.

The device 20 is, for example, an image forming apparatus such as an MFP. By using the application provided from the cloud server 10, the device 20 can provide various services to a user.

The configuration of the cloud system 1 illustrated in FIG. 1 is one example, and other configurations may be employed. For example, the cloud server 10 may be an information processing system (computer system) that includes a plurality of information processing apparatuses. In addition, the device 20 is not limited to the multifunction peripheral, but may be a digital camera, a printer, a copier, a projector, a facsimile, an electronic conference terminal, an electronic whiteboard, audio device, an in-vehicle device (e.g., car navigation system, etc.), a home appliance (e.g., refrigerator, etc.), or the like.

Hardware Configuration

Figure 2:
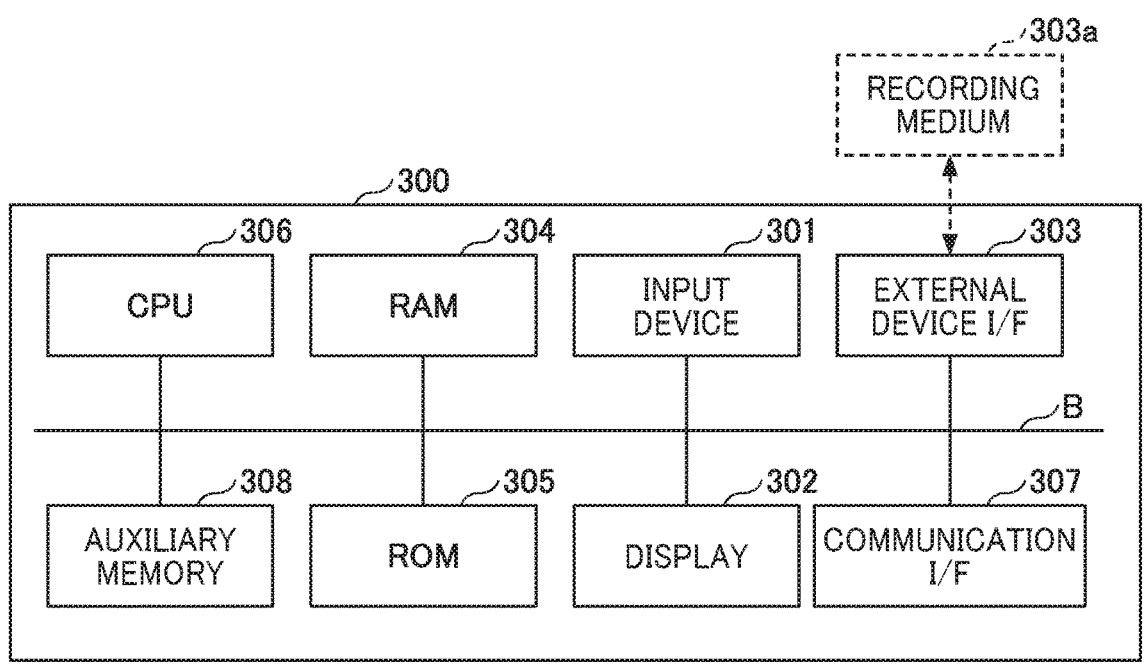
FIG. 2 is a diagram illustrating one example of a hardware configuration of a computer, according to the first embodiment.

Next, a hardware configuration of the cloud server 10 according to the present embodiment will be described with reference to FIG. 2. FIG. 2 is a diagram illustrating one example of a hardware configuration of a computer 300.

One or more information processing apparatuses in the cloud server 10 may each be implemented by the computer 300 illustrated in FIG. 2.

The computer 300 illustrated in FIG. 2 includes an input device 301, a display 302, an external device I/F 303, and a RAM (Random Access Memory) 304. In addition, the computer 300 includes a ROM (Read Only Memory) 305, a CPU (Central Processing Unit) 306, a communication I/F 307, and an auxiliary memory 308. Each hardware is connected by a bus B.

The input device 301 includes a keyboard, a mouse, a touch panel, and the like, and is used by a user to input various operations. The display 302 includes a display such as a liquid crystal display, and displays a result of a process performed by the computer 300. The computer 300 may not have at least the input device 301 or the display 302.

The external device I/F 303 is an interface circuit for communication with an external device. As the external device, a recording medium 303a can be given as an example. The computer 300 can read and write the recording medium 303a via the external device I/F 303. Examples of the recording medium 303a include a flexible disk, a CD, a DVD, an SD memory card, and a USB memory.

The RAM 304 is a volatile semiconductor memory that temporarily stores programs and data. The ROM 305 is a non-volatile semiconductor memory that can keep storing programs and data even when power is turned off. In the ROM 305, programs and data such as a BIOS (Basic Input/Output System), an OS (Operating System) setting, and a network setting that are executed at startup of the computer 300 are stored.

The CPU 306 is a computing device that reads, programs and data from a memory such as the ROM 305 and the auxiliary memory 308, onto the RAM 304 and executes a process, to control the entire computer 300.

The communication IF 307 is an interface circuit that connects the computer 300 to the network N. The computer 300 can perform data communication via the communication I/F 307.

The auxiliary memory 308 is, for example, an HDD (Hard Disk Drive), an SSD (Solid State Drive) or the like, and is a non-volatile memory storing programs and data. The examples of the programs and data stored in the auxiliary memory 308 include an OS that is basic software for controlling the entire computer 300 and application software for providing various functions on the OS. The auxiliary memory 308 manages the stored programs and data by a predetermined file system and a predetermined DB (database).

The one or more information processing apparatuses in the cloud server 10 can carry out various kinds of processes such as that described later by having the hardware configuration of the computer 300 illustrated in FIG. 2.

Figure 3:
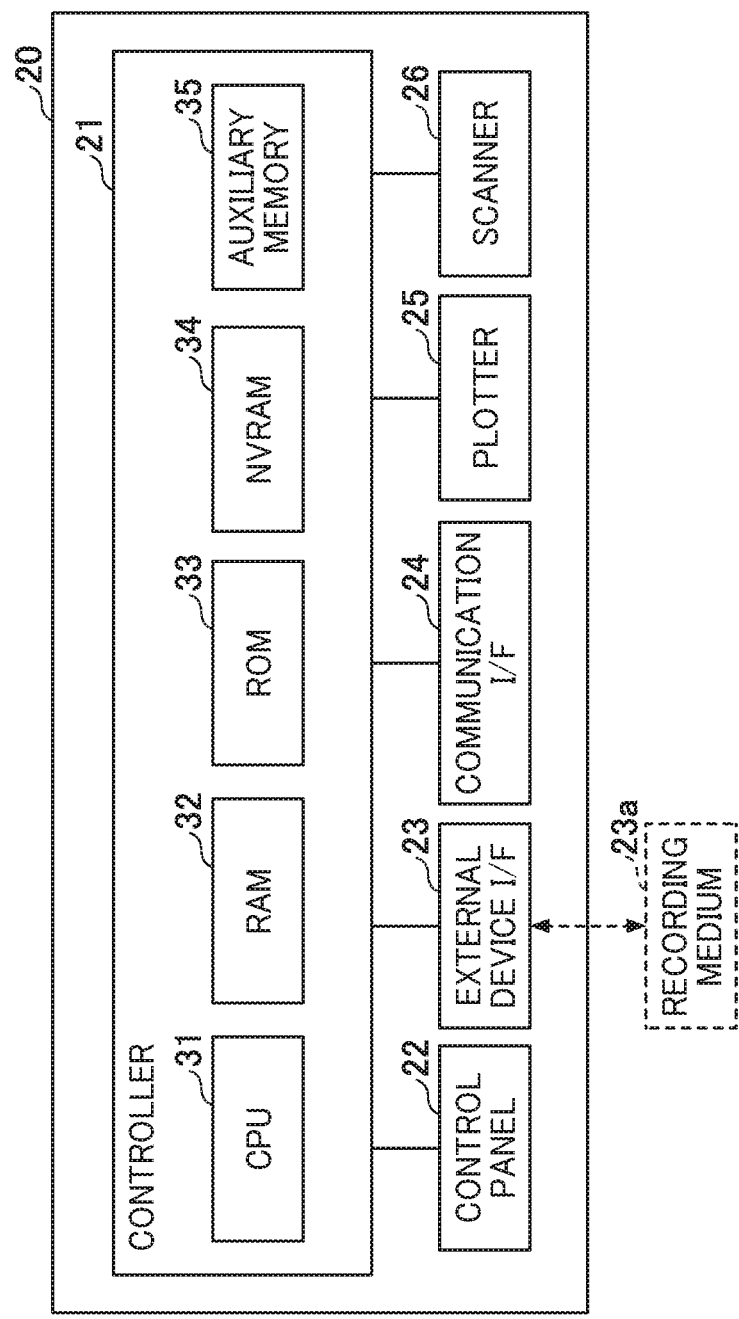
FIG. 3 is a diagram illustrating one example of a hardware configuration in a case where device according to the first embodiment is an image forming apparatus.

Next, a hardware configuration in a case where the device 20 according to the present embodiment is an image forming apparatus will be described with reference to FIG. 3. FIG. 3 is a diagram illustrating one example of the hardware configuration in a case where the device 20 according to the present embodiment is the image forming apparatus.

The device 20 illustrated in FIG. 3 includes a controller 21, a control panel 22, an external device I/F 23, a communication I/F 24, a plotter 25, and a scanner 26. In addition, the controller 21 has a CPU 31, a RAM 32, a ROM 33, an NVRAM 34, and an auxiliary memory 35.

The ROM 33 is a non-volatile semiconductor memory that can keep storing programs and data even when power is turned off. The RAM 32 is a volatile semiconductor memory that temporarily stores programs and data. The NVRAM 34 is a non-volatile semiconductor memory that stores setting information, for example. In addition, the auxiliary memory 35 is, for example, an HDD, an SSD, or the like, and is a non-volatile memory storing programs and data.

The CPU 31 is a computing device that reads, programs, data, setting information and the like from a memory such as the ROM 33, the NVRAM 34, the auxiliary memory 35 and the like, onto the RAM 32 and executes a process, to control operation of the entire device 20.

The control panel 22 is an input-output device which includes an input unit that accepts an input from a user and a display unit that performs display. The external device I/F 23 is an interface circuit that exchanges data with an external device. As the external device, a recording medium 23a can be given as an example. The device 20 can read and write the recording medium 23a via the external device I/F 23.

Examples of the recording medium 23a include an IC card, a flexible disk, a CD, a DVD, an SD memory card, and a USB memory.

The communication I/F 24 is an interface that connects the device 20 to the network N. The device 20 can perform data communication via the communication I/F 24.

The plotter 25 is a printer for printing data on a medium to be printed. The medium to be printed is not limited to a paper. The medium to be printed may be, for example, an OHP sheet, a plastic film, a copper foil, or the like. The scanner 26 is a reader that reads an original into image data.

The device 20 according to the present embodiment can carry out various kinds of processes such as that described later by having the hardware configuration illustrated in FIG. 3.

Function Configuration

Figure 4:
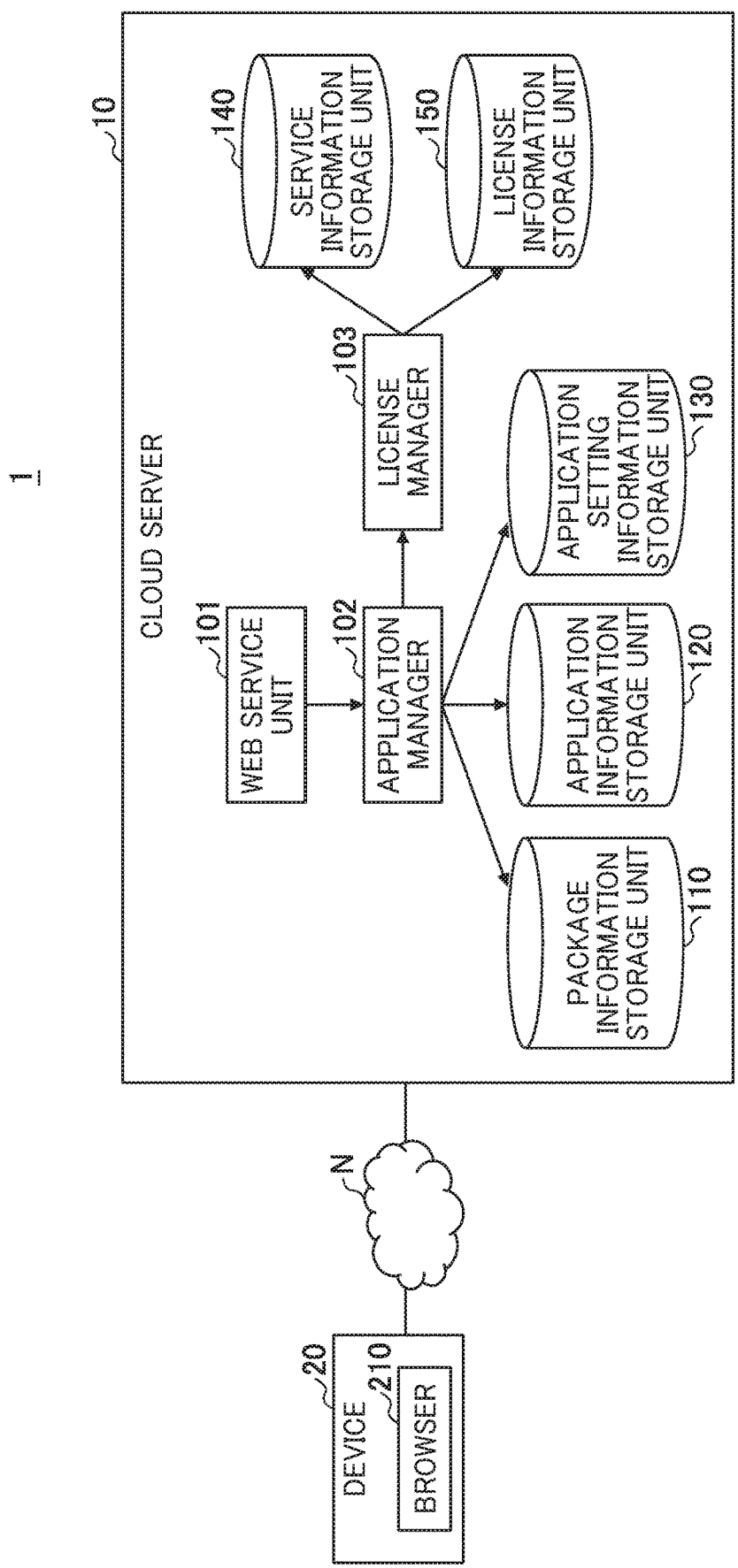
FIG. 4 is a diagram illustrating one example of a function configuration of the cloud system according to the first embodiment.

Next, a function configuration of the cloud system 1 according to the present embodiment will be described with reference to FIG. 4. FIG. 4 is a diagram illustrating one example of the function configuration of the cloud system according to the present embodiment.

As illustrated in FIG. 4, the device 20 according to the present embodiment includes a general-purpose Web browser 210 (hereinafter simply referred to as "browser 210"). A user of the device 20 can utilize the browser 210 to use an application provided by the cloud server 10.

The cloud server 10 according to the present embodiment includes a Web service unit 101, an application manager 102, and a license manager 103. These units are implemented by a process that one or more programs installed in the cloud server 10 cause the CPU 306 to execute.

In addition, the cloud server 10 includes a package information storage unit 110, an application information storage unit 120, an application setting information storage unit 130, a service information storage unit 140, and a license information storage unit 150. Each of these storage units can be implemented with the use of the auxiliary memory 308, for example. At least one storage unit of these storage units may be implemented with the use of a memory or the like connected to the cloud server 10 via the network N.

In response to various requests from the browser 210, the web service unit 101 displays and returns a screen for a user of the device 20 to select an application to use (application list screen), a screen for the user to use the application (application using screen), or the like.

The application manager 102 manages package information stored in the package information storage unit 110, application information stored in the application information storage unit 120, and application setting information stored in the application setting information storage unit 130.

The package information indicates a package that is a sale unit of a product (application). The package contains one or more applications. The application information indicates an application to be provided to the device 20. The application information includes, for example, an application name and a description of the application. The application setting information indicates a default setting of when a user of the device 20 uses the application. The application setting information is, for example, a default setting value of print setting, a default setting value of scan setting, and the like.

The license manager 103 manages service information stored in the service information storage unit 140 and license information stored in the license information storage unit 150.

The service information indicates a service to be introduced by purchasing a package or the like. The service information includes, for example, a service name and a description of the service. The license information indicates a license of an application for each package. The license information includes, for example, information indicating a number of the device 20 usable of the application included in the package, the device 20 in use of these applications, and the like.

When the cloud server 10 according to the present embodiment includes a plurality of information processing apparatuses, the Web service unit 101, the application manager 102, and the license manager 103 may be implemented by respective different information processing apparatuses.

Figure 5:
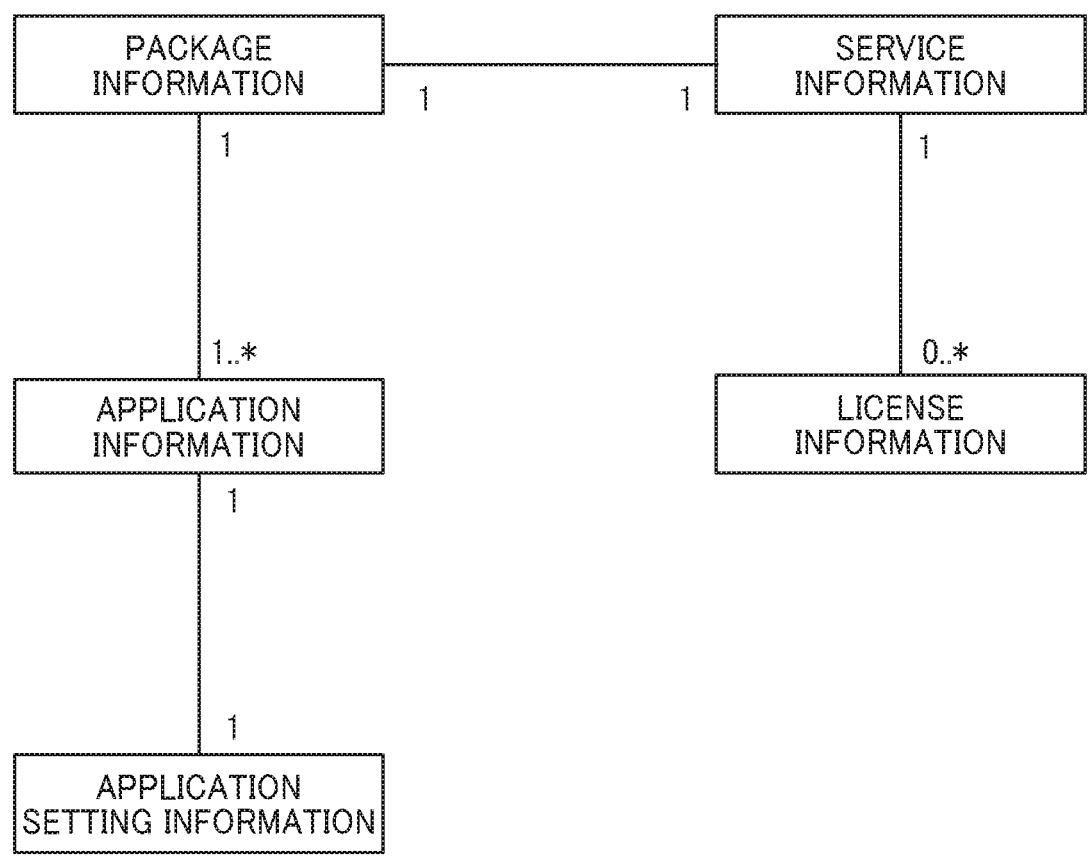
FIG. 5 is a diagram illustrating one example of relation between various types of information managed by a cloud server.

Here, association between various types of information (the package information, the application information, the application setting information, the service information, and the license information) managed by the cloud server 10 will be described with reference to FIG. 5. FIG. 5 is a diagram illustrating one example of association between various types of information managed by the cloud server.

As illustrated in FIG. 5, there is one-to-many (one or more) relation between the package information and the application information. This indicates that one package contains one or more applications. In addition, there is one-to-one relation between the application information and the application setting information. This indicates that, for one application, there is one default setting for using this application.

In addition, there is one-to-one relation between the package information and the service information. This indicates that a certain service provided by an application included in this package is introduced by a certain user purchasing a certain package or the like. Furthermore, there is one-to-many relation (0 or more) between the service information and the license information. This indicates that, for a service introduced to a certain user, there is 0 or more of licenses for using an application included in a package corresponding to this service (including a license a valid period of which is expired and including a case where no license exists).

The package information, the application information and the application setting information are created, for example, by a package (and an application) being created and released and are stored in the package information storage unit 110, the application information storage unit 120, and the application setting information storage unit 130. The service information and the license information are created by, for example, by a user of the device 20 purchasing the package or the like and are stored in the service information storage unit 140 and the license information storage unit 150.

Here, the package information stored in the package information storage unit 110 will be described with reference to FIG. 6. FIG. 6 is a diagram illustrating one example of the package information.

As illustrated in FIG. 6, the package information stored in the package information storage unit 110 includes a "package ID", a "package name", a "description of package", a "service ID", and an "application ID list".

The "package ID" is identification information for identifying the package information. The "package name" is a name of the package.

In the example illustrated in FIG. 6, in the package information of a package ID "P001", a "storage A package" is set as the "package name". This represents that a package indicated by the package information is, for example, a package including an application linked with a "storage A" that is an external storage service.

Similarly, a "storage B package" is set as the "package name" in the package information of a package ID "P002". This represents that the package indicated by the package information is, for example, a package including an application linked with a "storage B" that is an external storage service.

The "description of package" is a description of a package (e.g., a description of what kind of application is included in the package, etc.). The "service ID" is identification information (service ID) for identifying service information associated with the package information. The "application ID list" is a list of identification information (application ID) for identifying application information indicating an application included in the package.

In the example illustrated in FIG. 6, "APP001", "APP002", and the like are set as the "application ID list" in the package information having a "package ID" of "P00". This represents that the package indicated by the package information includes an application identified by the application ID "APP001", an application identified by the application ID "APP002", and the like.

The package information is not limited to each of the above data items, and may include, for example, various data items such as a "release date" indicating a date on which the package was released (sale start date), and an "updated date" indicating a date on which the package was updated.

Next, the application information stored in the application information storage unit 120 will be described with reference to FIG. 7. FIG. 7 is a diagram illustrating one example of the application information.

As illustrated in FIG. 7, in the application information stored in the application information storage unit 120, an "application ID", an "application name", a "description of application", a "creation date", and a "developer information" are included.

The "application ID" is identification information for identifying the application information indicating an application. The "application name" is a name of the application.

In the example illustrated in FIG. 7, in the application information of the application ID "APP001", "Scan to Email" is set as the "application name". This represents that the application indicated by the application information is, for example, an application that transmits image data generated by scanning with the device 20 to a designated email address.

Similarly, in the application information of the application ID "APP002", "Scan to Me" is set as the "application name". This represents that the application indicated by the application information is, for example, an application that transmits the image data generated by scanning with the device 20 to its own email address.

Moreover, similarly, in the application information of the application ID "APP003", "Scan to storage A" is set as the "application name". This represents that the application indicated by the application information is, for example, an application that stores (uploads), the image data generated by scanning with the device 20, in a "storage A" that is an external storage service.

The "description of application" is a description of the application (e.g., a description of what kind of application, etc.). The "creation date" is a date on which the application was created. The "developer information" is information on a developer who developed the application (e.g., developer name, development division, contact information, etc.).

The application information is not limited to each of the above data items, and may include, for example, various data items such as a "release date" indicating a date on which the application was released, and an "updated date" indicating a date on which the application was updated.

Next, the application setting information stored in the application setting information storage unit 130 will be described with reference to FIG. 8. FIG. 8 is a diagram illustrating one example of the application setting information.

As illustrated in FIG. 8, the application setting information stored in the application setting information storage unit 130 includes an "application setting ID", an "application ID", and a "default setting".

The "application setting ID" is identification information for identifying the application setting information. The "application ID" is an application ID for identifying application information associated with the application setting information. The "default setting" is a default setting for using this application.

In the example illustrated in FIG. 8, in the application setting information having the application setting ID "SET001", "resolution=300 dpi" or the like is set as the "default setting". This represents that the "resolution=300 dpi" or the like is applied as the default setting for using the application indicated by the application ID "APP001".

The application setting information is not limited to each of the above data items, and may include, for example, various data items such as a "creation date" indicating a date on which the application setting information is created.

Next, the service information stored in the service information storage unit 140 will be described with reference to FIG. 9. FIG. 9 is a diagram illustrating one example of the service information.

As illustrated in FIG. 9, the service information stored in the service information storage unit 140 includes a "service ID", a "service name", a "description of service", and a "service type".

The "service ID" is identification information for identifying the service information. The "service name" is a name of the service.

In the example illustrated in FIG. 9, in the service information of a service ID "S1111", a "storage A linked service" is set as the "service name". This represents that a service liked with the storage A is introduced by a package indicated by package information associated with the service information having the service ID "S1111".

Similarly, in the service information having a service ID "S2222", a "storage B linked service" is set as the "service name". This represents that a service linked with the storage B is introduced by a package indicated by package information associated with the service information having the service ID "S2222".

The "description of service" is a description of service (e.g., a description of what kind of service, etc.). The "service type" is a type of the service. As the service type, a "cloud service" indicating that a service is a cloud type service can be given as an example. As the service type, in addition to the "cloud service", for example, a "Web service" indicating that a service is a service provided by a Web application may be set.

The service information is not limited to each of the above data items, and may include, for example, various data items such as a "price" to which a price of a package indicated by package information associated with the service information is set.

Next, the license information stored in the license information storage unit 150 will be described with reference to FIG. 10. FIG. 10 is a diagram illustrating one example of the license information.

As illustrated in FIG. 10, the license information stored in the license information storage unit 150 includes a "license ID", a "license name", a "use start date", a "scheduled termination date", a "terminated date, a "status", a "number of device usable of application", an "ID of device in use", and a "service ID".

The "license ID" is identification information for identifying the license information. The "license name" is a name of the license. The "use start date" is a date on which the license became valid. The "scheduled termination date" is a scheduled date on which the license will be terminated. The "terminated date" is a date on which the license actually terminated. If the license has not yet been terminated, a blank is set in the "terminated date", for example.

The "status" is a status of the license. To the "status", "in use" indicating that the license is valid, "terminated" indicating that the license is invalid due to expiration of a term, or the like is set. For example, if the license becomes invalid due to termination of a contract before the scheduled termination date of the license, "cancelled" or the like may be set to the "status".

The "number of device usable of application" is a maximum number of the device 20 usable of an application included in a corresponding package (that is, a package indicated by package information associated with the license information via the service information). When a value such as "terminated" and "cancelled" indicating that the application cannot be used has been set to the data item "status", a hyphen "-" is set to the "number of device usable of application".

The "ID of device in use" is a list of device IDs indicating the device 20 in use of the application included in the corresponding package (that is, the device 20 to which a license has been applied (the device 20 to which a license has been assigned)). The device ID is identification information for identifying the device 20, and it is possible to use, for example, a manufacturing specific number, a serial number, or the like of the device 20. When a value such as "terminated" and "cancelled" indicating that the application cannot be used is has been set to the data item "status", a hyphen "-" is set to the "ID of device in use".

The "service ID" is for identifying the service information associated with the license information. A same service ID "S22222" is set as the license information having a license ID "L12346" and the license information having a license ID "L12347". This represents that a license has been updated by the license information having the license ID "L12347" after a license indicated by the license information having the license ID "L12346" is terminated. As described above, when a license of a package indicated by the package information corresponding to certain service information is terminated and a license of this package is updated, a same service ID is set to the data item "service ID" of the license information indicating this license.

The license information is not limited to the above data items, and may include, for example, data items such as a "purchased date" indicating a date on which a user purchased a package and "purchaser information" indicating information on a purchaser of the package.

Details of Process

Figure 11B:
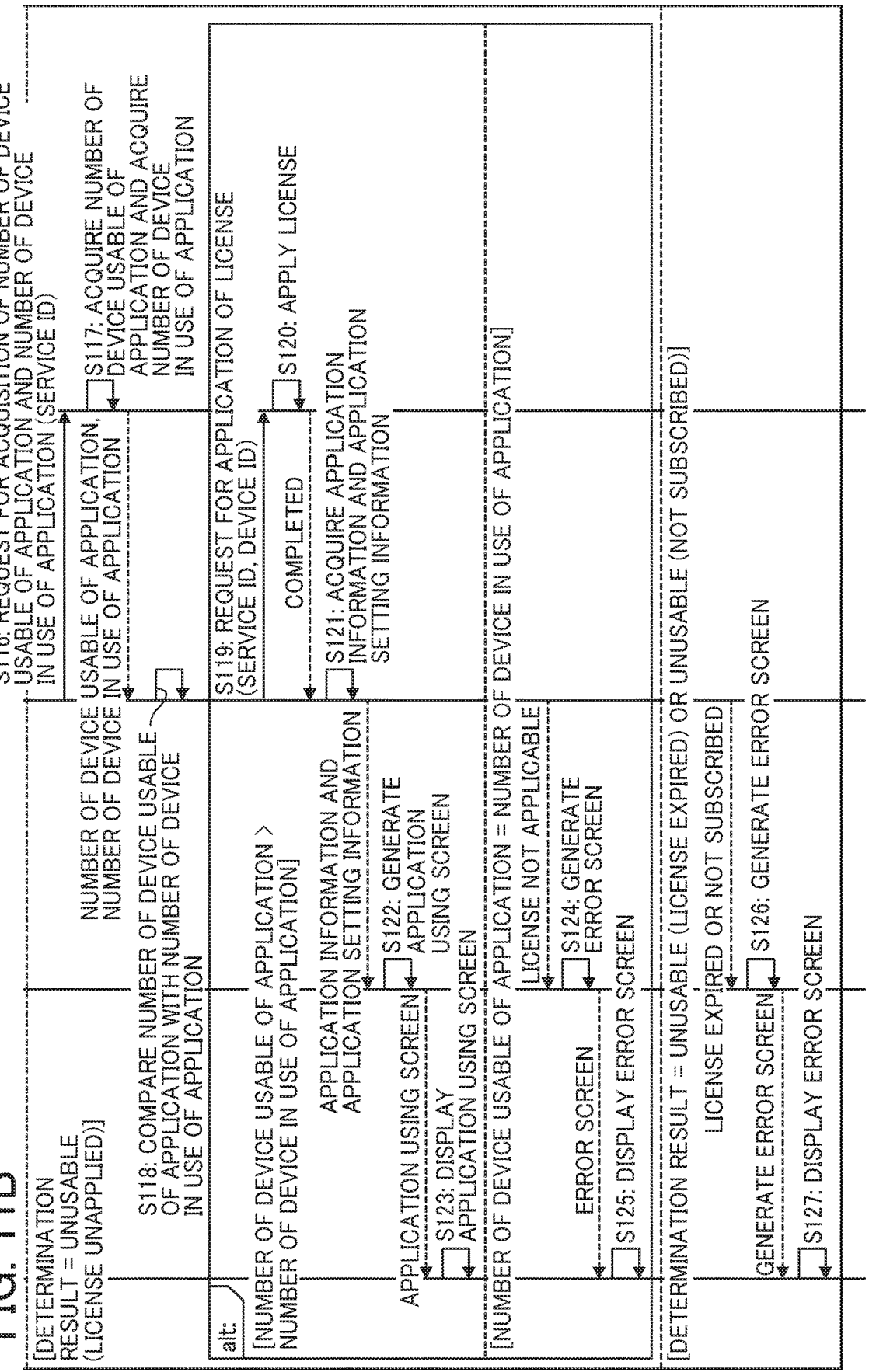

Next, details of a process of the cloud system according to the present embodiment will be described. Hereinafter, with reference to FIGS. 11A and 11B (FIG. 11), a process in which a user of the device 20 starts using an application provided by the cloud server 10 with the use of the browser 210. FIG. 11 is a sequence diagram illustrating one example of a process for starting use of the application according to the present embodiment.

The browser 210 accepts operation for displaying an application list screen (step S101). The user can perform the operation for displaying the application list screen by pressing, for example, a shortcut icon or the like for displaying the application list screen. Of a plurality of packages, the user may select a desired package and then perform the operation for displaying the application list screen for displaying the application list included in the selected package.

Upon accepting the operation for displaying the application list screen, the browser 210 transmits to the Web service unit 101 a request for a display of the application list screen (step S102). The request for the display of the application list screen includes a package ID indicating a package already purchased by the user. The package ID is, for example, a package ID defined in the shortcut icon or the like pressed by the user in the above step S101 or a package ID indicating a package selected by the user.

Upon receiving the request for the display of the application list screen, the web service unit 101 transmits to the application manager 102 a request for acquisition of an application list (step S103). The request for acquisition of the application list includes the above package ID.

Upon receiving the request for acquisition of the application list, the application manager 102 acquires, on the basis of a package ID included in the acquisition request, a list of application names and application IDs (application list) included in a package indicated by this package ID (step S104). That is, the application manager 102 refers to the package information storage unit 110 to specify an application ID set in the data item "application ID list" of the package information having the package ID included in the acquisition request. Then, the application manager 102 acquires, an application name that is set in the data item "application name" of the application information indicated by the specified application ID, among the application information stored in the application information storage unit 120. Consequently, an application list that is a list of application names and application IDs of the application included in the package is acquired.

Then, the application manager 102 returns to the Web service unit 101 the application list acquired from the application information storage unit 120.

When the application list is returned from the application manager 102, the Web service unit 101 generates an application list screen on the basis of the application list (step S105). The application list screen is information in which a screen to be displayed on the browser 210 is defined by, for example, HTML (Hyper Text Markup Language), CSS (Cascading Style Sheets), or the like.

Then, the Web service unit 101 returns the generated application list screen to the browser 210.

Figure 12:
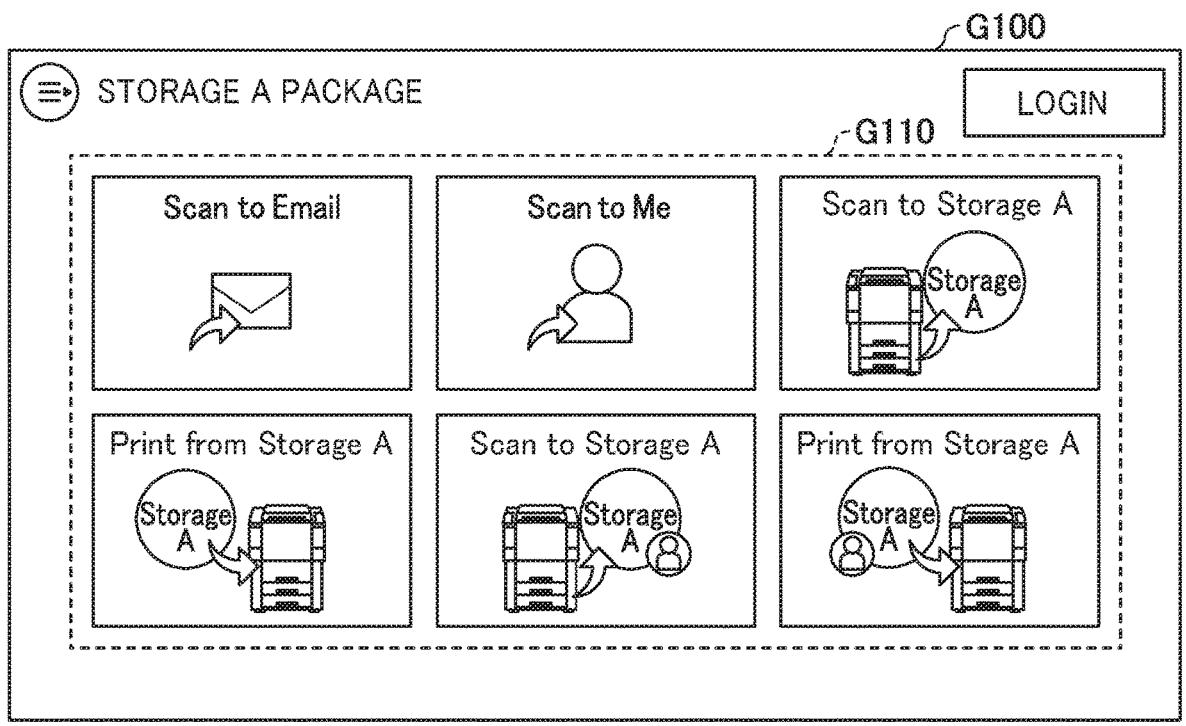
FIG. 12 is a diagram illustrating one example of an application list screen.

When the application list screen is returned from the Web service unit 101, the browser 210 displays, for example, an application list screen G100 illustrated in FIG. 12 (step S106). The application list screen G100 illustrated in FIG. 12 includes the application list G110 included in a storage A package. The application list G110 is generated on the basis of the application list in the above step S105.

The user can perform operation for selecting an application that he/she wishes to use from the application list G110 (application selection operation). Hereinafter, the application selection operation is assumed to be performed by the user.

The browser 210 accepts the application selection operation (step S107). Upon receiving the application selection operation, the browser 210 transmits to the Web service unit 101 a request for a display of an application using screen (step S108). The request for the display of the application using screen includes an application ID indicating an application selected by the application selection operation and a device ID indicating the device 20 being used by the user.

Upon receiving the request for the display of the application using screen, the Web service unit 101 transmits to the application manager 102 a request for acquisition of application information (step S109). The request for the acquisition of the application information includes the application ID and the device ID described above.

Upon receiving the request for the acquisition of the application information, the application manager 102 specifies a service ID corresponding to the application ID included in the acquisition request (step S110). That is, the application manager 102 refers to the package information storage unit 110 to specify package information in which the application ID has been set to the data item "application ID list", and then specifies the service ID that has been set to the data item "service ID" of this package information.

Next, the application manager 102 transmits to the license manager 103 a request for determination of whether an application is usable (step S111). The request for the determination of whether the application is usable includes the service ID specified in the above step S110 and the above device ID.

Upon receiving the request for the determination of whether the application is usable, the license manager 103 determines whether the application is usable (step S112). Then, the license manager 103 returns a determination result to the application manager 102.

The result of the determination of whether the application is usable by the license manager 103 includes "usable" indicating that the application is usable and "unusable" indicating that the application is unusable. In addition, the determination result "unusable" is classified into "unusable (license unapplied)", "unusable (license expired)", and "unusable (not subscribed)" depending on reasons why the application cannot be used.

Figure 13:
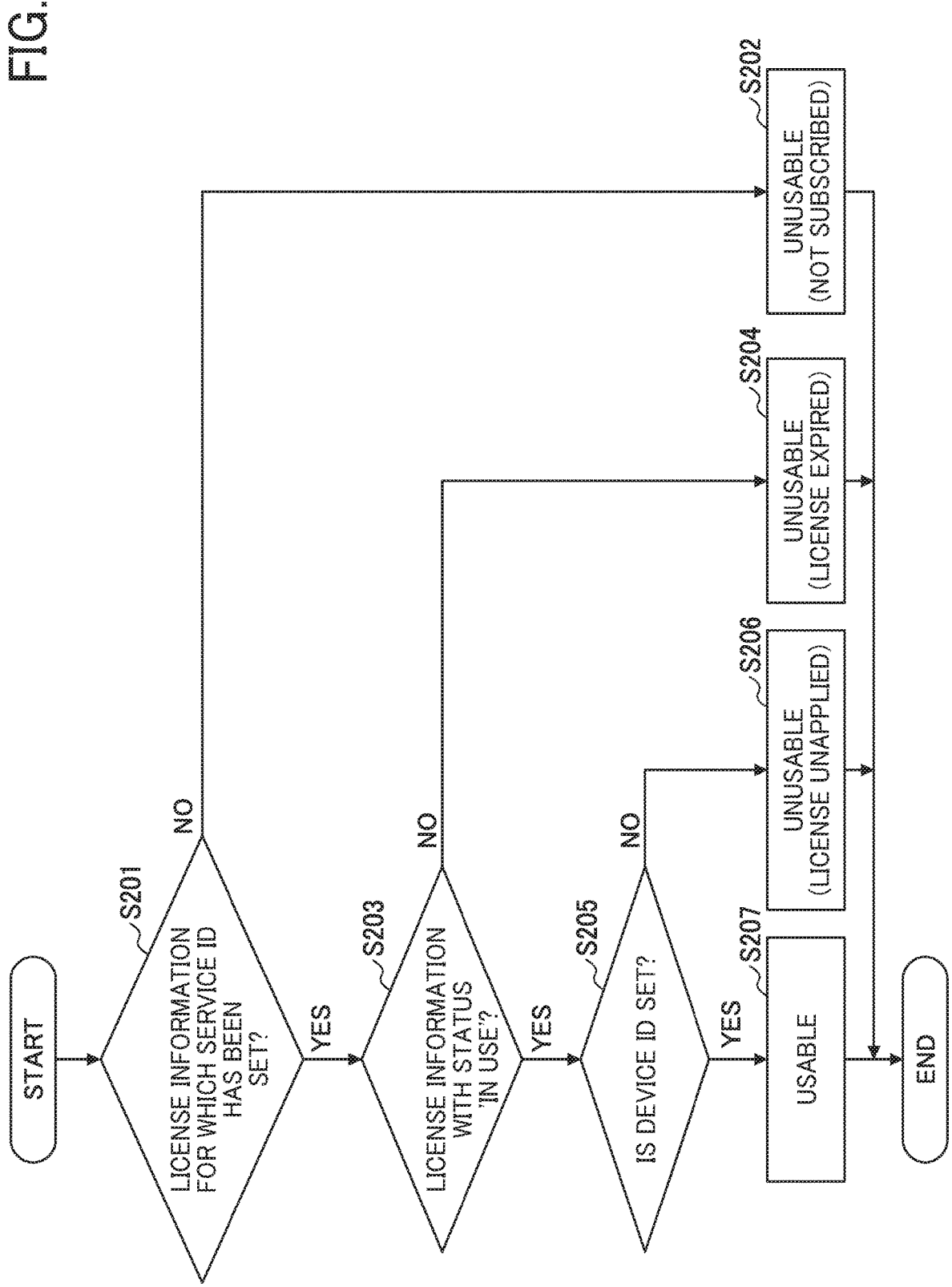
FIG. 13 is a flowchart illustrating one example of a process for determining whether an application is usable according to the first embodiment.

Here, details of a process for determining whether the application is usable in the above step S112 will be described with reference to FIG. 13. FIG. 13 is a flowchart illustrating one example of a process for determining whether the application is usable according to the first embodiment.

The license manager 103 determines whether there is, in the license information storage unit 150, one or more pieces of license information for which a service ID included in the request for the determination of whether the application is usable has been set to the data item "service ID" (step S201).

In step S201, if determining that there is no license information for which the service ID has been set to the data item "service ID", the license manager 103 determines that the application is "unusable (not subscribed)" (step S202). In this case, this is because the user has not purchased the package.

In step S201, if determining that there is one or more pieces of license information for which the service ID has been set to the data item "service ID", the license manager 103 determines whether there is, license information for which "in use" has been set to the data item "status", among the license information (step S203).

In step S203, if determining that there is no license information for which "in use" has been set to the data item "status", the license manager 103 determines that the application is "unusable (license expired)" (step S204). In this case, this is because although the user purchased the package once, the valid period of the license has elapsed or the contract has been canceled, and thus "terminated" or "canceled" has been set to the data item "status" of the license information.

In step S203, if determining that there is license information for which "in use" has been set to the data item "status", the license manager 103 determines whether the device ID included in the request for determination of "application is usable" has been set to the data item "ID of device in use" of the license information (step S205).

In step S205, if determining that the device ID has not been set to the data item "ID of device in use" of the license information, the license manager 103 determines the application is "unusable (license unapplied)" (step S206). In this case, although the user has purchased the package, the license has not been applied to the device 20 in use at present.

In step S205, if determining that the device ID has been set to the data item "ID of device in use" of the license information, the license manager 103 determines the application is "usable" (step S207). In this case, this is because the license of the package purchased by the user is currently applied to the device 20 in use at present.

Referring back to FIG. 11, if the result of the determination of whether the application is usable is "usable", subsequent steps S112 to S115 are executed. If the result of the determination of whether the application is usable is "unusable (license unapplied)", subsequent steps S116 to S125 are executed. If the result of the determination of whether the application is usable is "unusable (license expired)" or "unusable (not subscribed)", subsequent steps S126 and S127 are executed.

The following describes the example case when the result of the determination of whether the application is usable is "usable".

When a determination result indicating "usable" is returned from the license manager 103, the application manager 102 acquires application information and application setting information (step S113). That is, the application manager 102 acquires from the application information storage unit 120 the application information having the application ID included in the request for acquisition of the application information received in the above step S109 and acquires from the application setting information storage unit 130 the application setting information corresponding to this application information. Consequently, the application information and the application setting information of an application selected by a user in the application list screen G100 are acquired.

Then, the application manager 102 returns to the Web service unit 101 the acquired application information and application setting information.

When the application information and application setting information are returned from the application manager 102, the Web service unit 101 generates an application using screen on the basis of these application information and application setting information (step S114). The application using screen is information in which a screen to be displayed on the browser 210 is defined by, for example, HTML, CSS, or the like.

Then, the Web service unit 101 returns the generated application using screen to the browser 210.

Figure 14A:
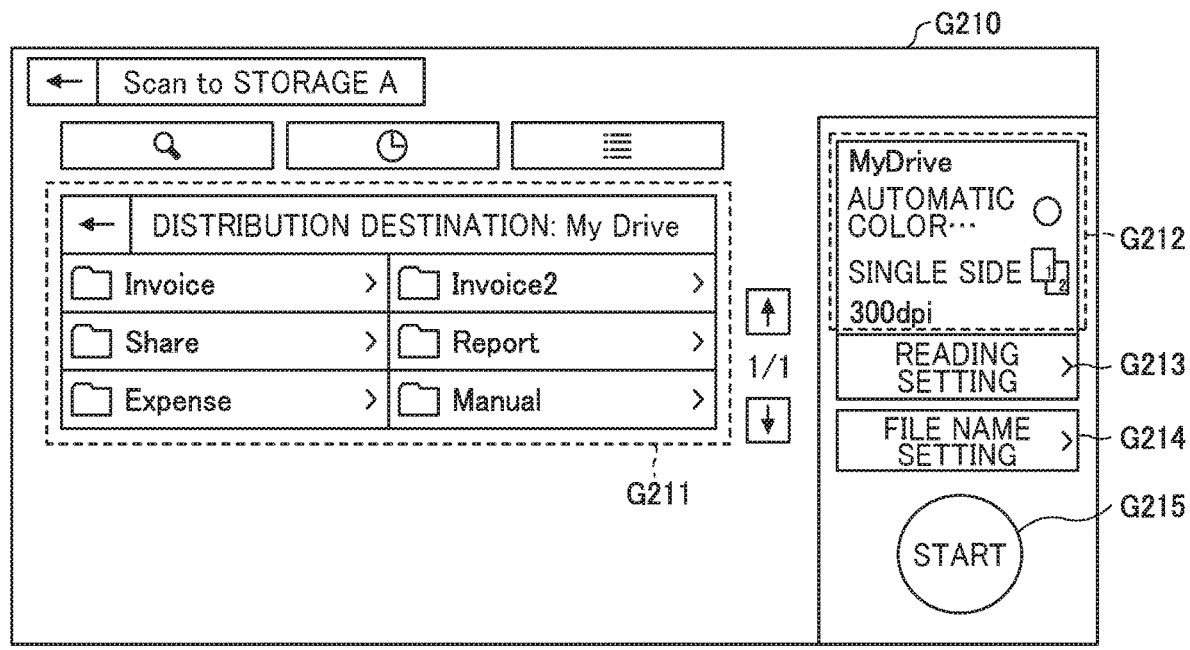
FIGS. 14A and 14B (FIG. 14) are illustrations of example application using screens.

When the application using screen is returned from the Web service unit 101, the browser 210 displays, for example, an application using screen G210 illustrated in FIG. 14A (step S115). The application using screen G210 illustrated in FIG. 14A is a screen for using an application having an application name "Scan to storage A". The application name and the like are generated on the basis of the application information in the above step S114.

The application using screen G210 illustrated in FIG. 14A includes, for example, a selection field G211 for selecting a distribution destination (storage destination in storage A) of image data generated by scanning. In addition, the application using screen G210 illustrated in FIG. 14A includes a default setting G212 in which a default setting value in the scanning is displayed and a reading setting button G213 for changing the default setting value. The default setting G212 is generated on the basis of the application setting information in the above step S114.

Furthermore, the application using screen G210 illustrated in FIG. 14A includes a file name setting button G214 for setting a file name of the image data and a start button G215 for starting use of the application.

Figure 14B:
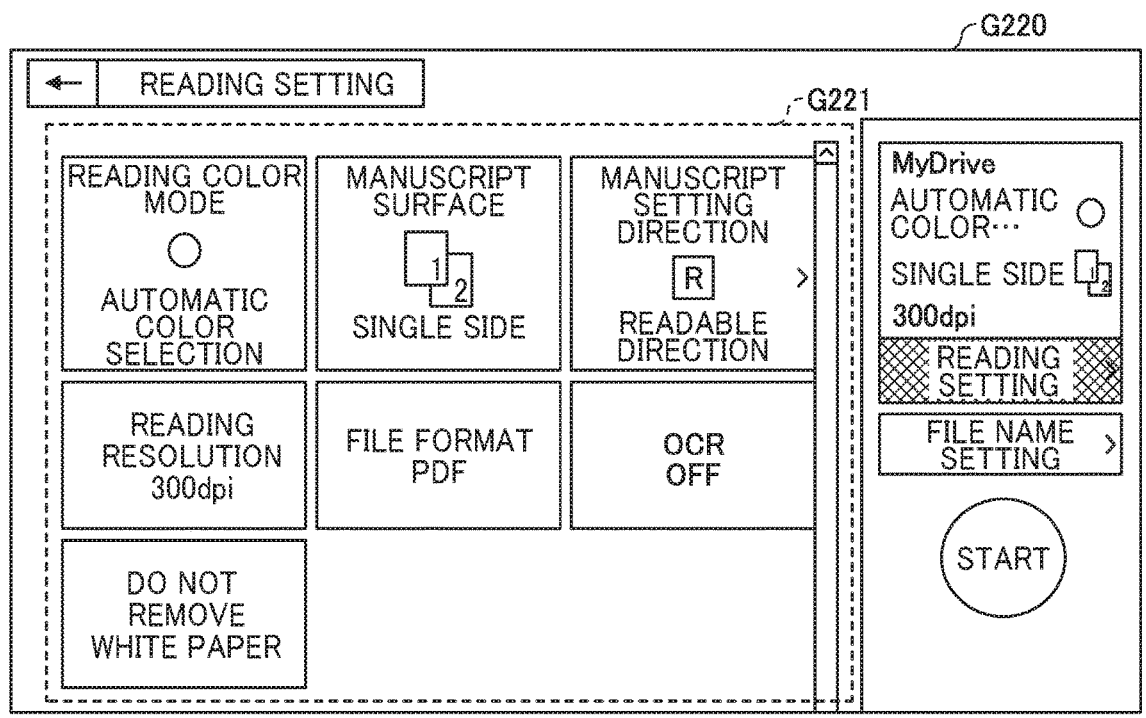

Here, when the reading setting button G213 is pressed by a user, the browser 210 displays a reading setting screen G220 illustrated in FIG. 14B, for example. The reading setting screen G220 illustrated in FIG. 14B is a screen for changing the default setting value and includes a reading setting designating field G221. The user can change setting values of various scan settings (e.g., a reading color mode, double sided or single side for a manuscript surface, a manuscript setting direction, a reading resolution, a file format, etc.) in the reading setting designating field G221.

The user selects at least a desired distribution destination from the selection field G211 and then presses the start button G215. The user thereby can start using the application having the application name "Scan to storage A".

Referring back to FIG. 11B, the following describes the example case when the result of the determination of whether the application is usable is "unusable (license unapplied)".

When a determination result indicating "unusable (license unapplied)" is returned from the license manager 103, the application manager 102 transmits to the license manager 103 a request for acquisition of a number of device usable of the application and a number of device in use of the application (step S116). The request for acquisition of the number of device usable of the application and the number of device in use of the application includes the service ID specified in the above step S110.

Upon receiving the request for acquisition of the number of device usable of the application and the number of device in use of the application, the license manager 103 acquires the number of device usable of the application included in a corresponding package and the number of device in use of these applications (step S117). That is, the license manager 103 acquires a value (a number of device usable of the application) that has been set to the data item "number of device usable of application" of license information for which a service ID included in the acquisition request has been set to the data item "service ID" and "in use" has been set to the data item "status". In addition, the license manager 103 calculates a number of device IDs (a number of device in use of the application) that has been set to the data item "ID of device in use" of the license information.

Then, the license manager 103 returns to the application manager 102 the number of device usable of the application and the number of device in use of the application.

When the number of device usable of the application and number of device in use of the application are returned from the license manager 103, the application manager 102 compares the number of device usable of the application with the number of device in use of the application (step S118).

If the number of device usable of the application is larger than the number of device in use of the application (that is, if a license is newly applicable (assignable) to the device 20), subsequent steps S119 to S123 are executed. If the number of device usable of the application is equal to the number of device in use of the application (that is, if a license is not newly applicable (assignable) to the device 20 since the number of device usable of the application has reached a maximum), subsequent steps S124 and S125 are executed.

In the above step S118, if determining that the number of device usable of the application is larger than the number of device in use of the application, the application manager 102 transmits to the license manager 103 a request for application of license (step S119). The request for application of license includes the service ID specified in the above step S110 and a device ID indicating the device 20 being used by the user.

Upon receiving the request for application of license, the license manager 103 applies a license to the device 20 indicated by the device ID included in the application request (step S120). That is, the license manager 103 adds this device ID to the data item "ID of device in use" of license information for which the service ID included in the application request has been set to the data item "service ID" and "in use" has been set to the data item "status". Consequently, the license is applied to the device 20 indicated by this device ID (the device 20 being used by the user). The license information to which this device ID is added is the same license information as that from which the number of device usable of the application and the number of device in use of the application are acquired in the above step S117.

Then, the license manager 103 returns to the application manager 102 information indicating that the application of the license has been completed.

As is the case with the above step S113, the application manager 102 acquires application information and application setting information (step S121). Then, the application manager 102 returns to the Web service unit 101 the acquired application information and application setting information.

When the application information and application setting information are returned from the application manager 102, the Web service unit 101 generates an application using screen on the basis of these application information and application setting information (step S122) as is the case with the above step S114. Then, the Web service unit 101 returns to the browser 210 the generated application using screen.

When the application using screen is returned from the Web service unit 101, the browser 210 displays, for example, the application using screen G210 illustrated in FIG. 14 (step S123) as is the case with the above step S115. Consequently, the user of the device 20 that is newly licensed can start using the application.

In the above step S118, if determining that the number of device usable of the application and the number of device in use of the application are equal, the application manager 102 returns to the web service unit 101 information indicating that a license is not applicable. When the information indicating that the license is not applicable is returned from the application manager 102, the web service unit 101 generates an error screen indicating that the license cannot be applied (step S124). Then, the Web service unit 101 returns the generated error screen to the browser 210.

When the error screen is returned from the Web service unit 101, the browser 210 displays, for example, an error screen G300 illustrated in FIG. 15 (step S125). The error screen G300 illustrated in FIG. 15 displays a message indicating that the number of device usable of the application has reached the maximum, and thus the license cannot be newly applied and the application cannot be used. Consequently, the user can know that the application cannot be used because the license cannot be applied.

The following describes the example case when the result of the determination of whether the application is "unusable (license expired)" or "unusable (not subscribed)".

When "unusable (license expired)" or "unusable (not subscribed)" is returned from the license manager 103, the application manager 102 returns to the Web service unit 101 information indicating that a license is expired or is not subscribed. When information indicating the license is expired or is not subscribed is returned from the application manager 102, the Web service unit 101 generates an error screen indicating that the license is expired or not subscribed according to the returned information (Step S126). Then, the Web service unit 101 returns the generated error screen to the browser 210.

When the error screen is returned from the Web service unit 101, the browser 210 displays an error screen indicating that the license is expired or an error screen indicating that the license is not subscribed according to the returned error screen (step S127). Consequently, the user can know that the application cannot be used because the license is expired or is not subscribed.

As described above, in the cloud system 1 according to the present embodiment, even in a case where a license is not applied to the device 20 used by a user, if the license can be newly applied, the license is dynamically applied to the device 20.

In addition, in the cloud system 1 according to the present embodiment, a device ID is added to license information managed by the cloud server 10, and a license thereby can be applied to the device 20 having the device ID.

Consequently, the user can easily apply the license to the device 20 used by him/her without installing the license, applying the license, and the like.

That is, the cloud system 1 determines whether the license of a specific application that is requested for use by the device 20 is applicable to the device 20 at S201 and S203. When the license of the requested application is applicable to the device 20 but is set as not useable by the device 20 at S205, the cloud system 1 allows the device 20 to use the requested application by applying the license to the device 20.

Second Embodiment

Next, a second embodiment will be described. In the second embodiment, a case where a license is newly applicable and the license is newly applied only if a user of the device 20 has predetermined authority. Thus, for example, it is possible to place restriction such that the new application of a license is not permitted for a user who has only general authority whereas the new application of the license is permitted for a user who has administrator authority.

In the second embodiment, differences from the first embodiment will be mainly described, and description of the same components as in the first embodiment will be omitted as appropriate.

Function Configuration

Figure 16:
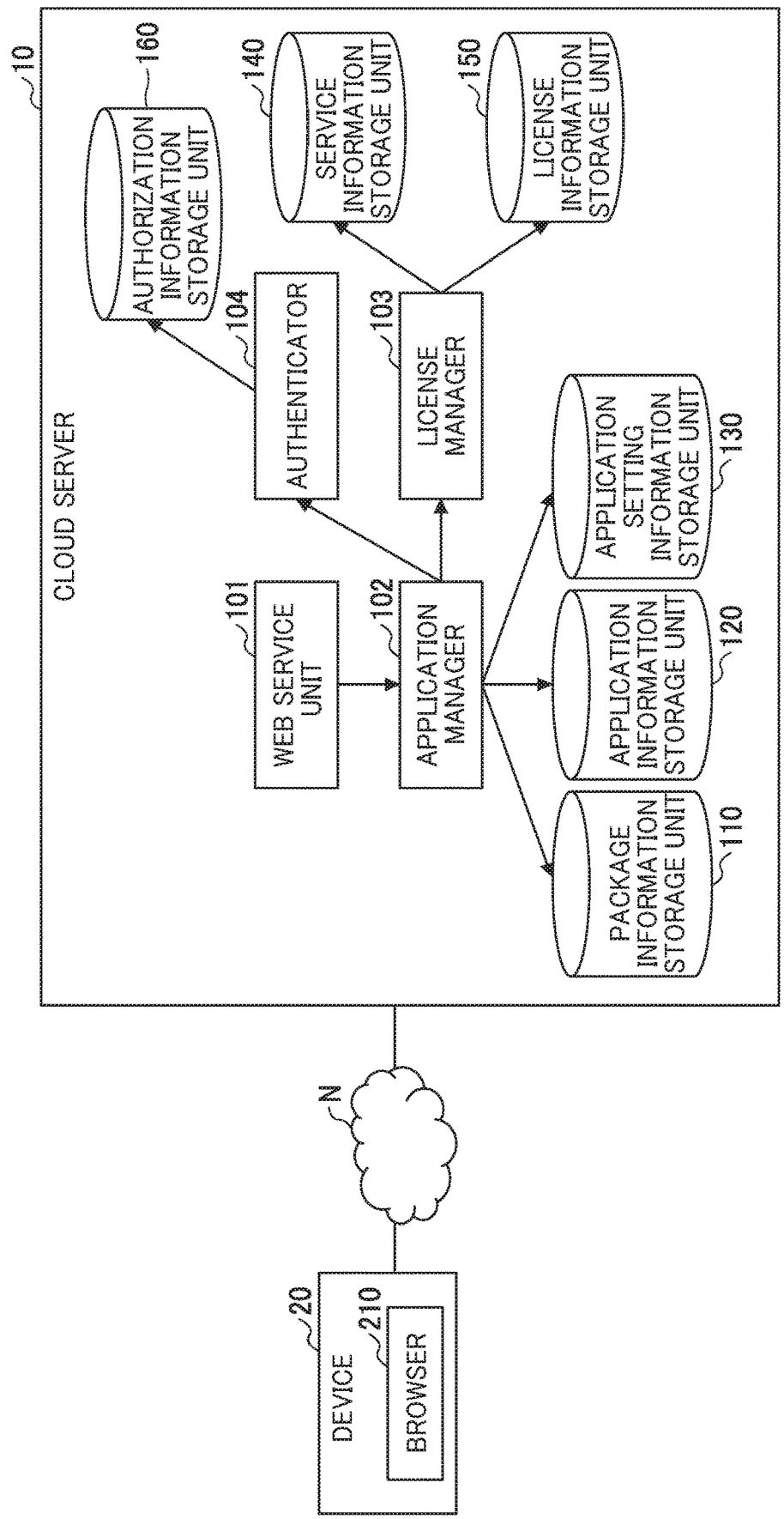
FIG. 16 is a diagram illustrating one example of a function configuration of a cloud system according to a second embodiment.

First, a function configuration of the cloud system 1 according to the present embodiment will be described with reference to FIG. 16. FIG. 16 is a diagram illustrating one example of the function configuration of the cloud system 1 according to the present embodiment. The function configuration of the device 20 is the same as that of the first embodiment, and thus the description thereof will be omitted.

As illustrated in FIG. 16, the cloud server 10 according to the present embodiment further includes an authenticator 104. The authenticator 104 is implemented by a process that one or more programs installed in the cloud server 10 cause the CPU 306 to execute.

The cloud server 10 further includes an authorization information storage unit 160. The authorization information storage unit 160 can be implemented with the use of the auxiliary memory 308, for example. The authorization information storage unit 160 may be implemented with the use of a memory or the like connected to the cloud server 10 via the network N.

The authenticator 104 authenticates a user who is using the device 20. In addition, the authenticator 104 refers to the authorization information storage unit 160 to verify authority of the user.

The authorization information storage unit 160 stores authorization information indicating the authority of the user. Here, the authorization information stored in the authorization information storage unit 160 will be described with reference to FIG. 17. FIG. 17 is a diagram illustrating one example of the authorization information.

As illustrated in FIG. 17, the authorization information stored in the authorization information storage unit 160 includes a "user ID" and "authority" as data items.

The "user ID" is identification information for identifying a user. The "authority" is authority owned by the user. As the authority, there are, for example, general authority and administrator authority which is higher authority than the general authority. Besides these, as authority, for example, there may be various authority such as special authority (e.g., developer authority etc.) that enables performing a specific operation.

Details of Process

Figure 18:
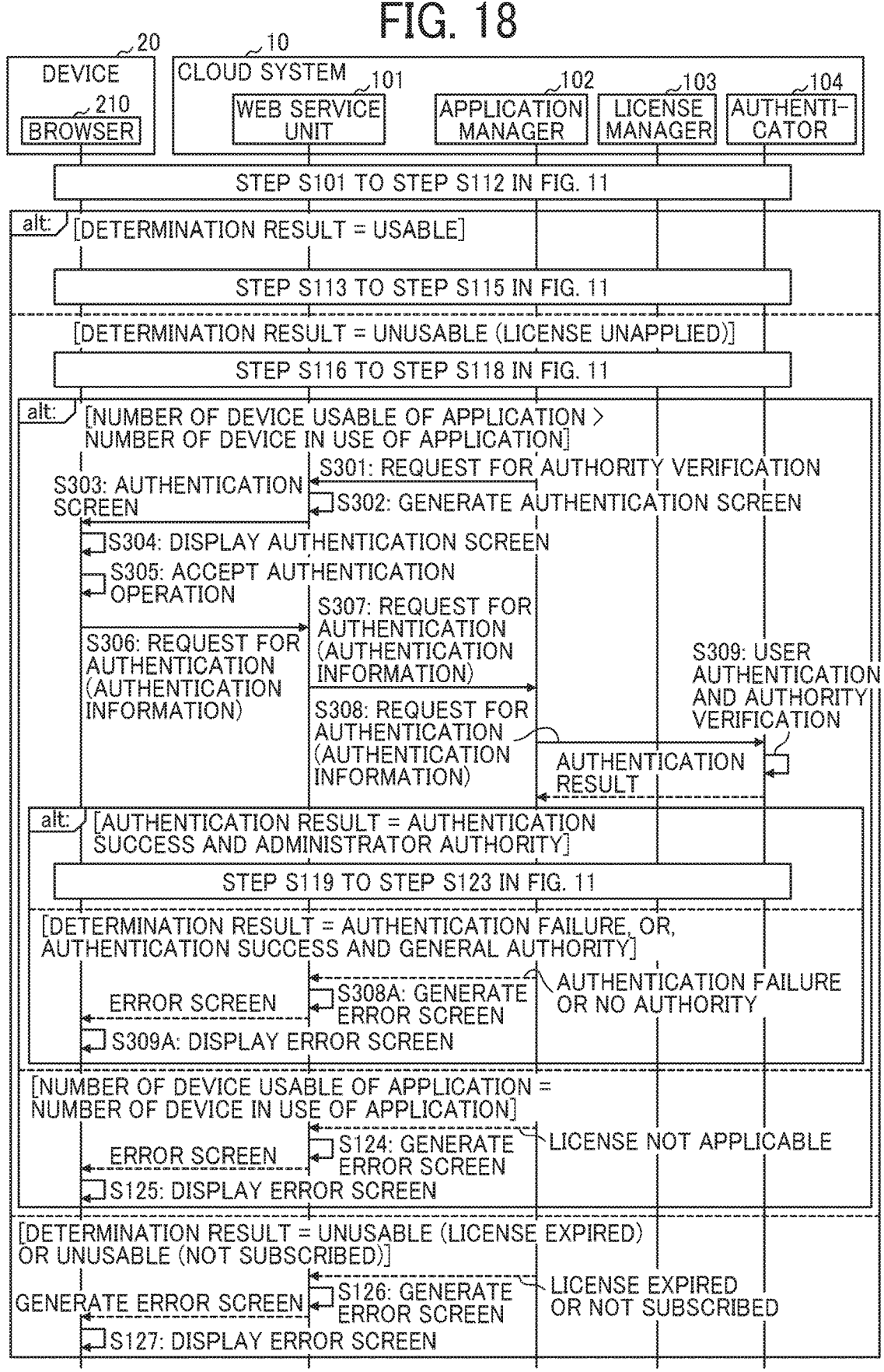
FIG. 18 is a sequence diagram illustrating one example of a process for starting use of an application according to the second embodiment.

Next, details of a process of the cloud system according to the present embodiment will be described. Hereinafter, a process in which a user of the device 20 starts using the application provided by the cloud server 10 with the use of the browser 210 will be described with reference to FIG. 18. FIG. 18 is a sequence diagram illustrating one example of a process for staring use of an application according to the present embodiment. Steps S101 to 127 in FIG. 18 are the same as those in FIG. 11, and the description thereof will be omitted.

In step S118, if determining that the number of device usable of the application is larger than the number of device in use of the application, the application manager 102 transmits to the Web service unit 101 a request for authority verification (step S301).

Upon receiving the request for authority verification, the Web service unit 101 generates an authentication screen for performing user authentication (step S302). Then, the Web service unit 101 transmits the generated authentication screen to the browser 210 (step S303).

Upon receiving the authentication screen from the Web service unit 101, the browser 210 displays the authentication screen (step S304). The user can perform authentication operation by inputting authentication information (e.g., a set of a user ID and a password) in the authentication screen displayed by the browser 210.

The browser 210 accepts the authentication operation by the user (step S305). Upon accepting the authentication operation by the user, the browser 210 transmits a request for authentication to the Web service unit 101 (step S306). The request for authentication includes the authentication information entered by the user.

Upon receiving the request for authentication from the browser 210, the Web service unit 101 transmits the request for authentication to the application manager 102 (step S307). Next, upon receiving the request for authentication from the Web service unit 101, the application manager 102 transmits the request for authentication to the authenticator 104 (step S308).

Upon receiving the request for authentication from the application manager 102, the authenticator 104 performs user authentication and authority verification (step S309). That is, first, the authenticator 104 verifies whether the authentication information included in the request for authentication is legitimate. Next, if the authentication information is verified to be legitimate, the authenticator 104 refers to the authorization information storage unit 160 to verify authority associated with the user ID included in the authentication information. Consequently, user authentication and authority verification are performed.

Then, the authenticator 104 returns an authentication result to the application manager 102. The authentication result includes information indicating whether the user authentication has succeeded ("authentication success" or "authentication failure"). In addition, if the user authentication succeeds, the authentication result further includes the verified authority ("administrator authority" or "general authority").

If the authentication result is "authentication success" and "administrator authority", steps S119 to S123 are executed. In this case, a license is newly applied to the device 20, and then the user of the device 20 can start using the application.

If the authentication result is "authentication failure" or the authentication result is "authentication success" and "general authority", the application manager 102 returns to the Web service unit 101, according to the authentication result, information indicating authentication failure or no authority. When the information indicating the authentication failure or no authority is returned, the Web service unit 101 generates an error screen indicating the authentication failure or an error screen indicating no authority according to the returned information (step S308A). Then, the Web service unit 101 returns to the browser 210 the error screen indicating the authentication failure or the error screen indicating no authority.

When the error screen is returned from the Web service unit 101, the browser 210 displays the error screen indicating the authentication failure or the error screen indicating no authority according to the returned error screen (step S309A). Consequently, the user can know that the application cannot be used because the authentication has failed or there is no authority (although the authentication was successful).

As described above, the cloud system 1 according to the present embodiment can limit a number of device that can use an application provided as a cloud service. More specifically, in the cloud system 1 according to the present embodiment, in a case where a license is newly applied to the device 20, authority of a user who is using the device 20 is verified, and then only if the user has predetermined authority, the license is applied. Consequently, for example, the license can be applied only if the user having the predetermined authority is using the device 20. Therefore, for example, it is possible to prevent a situation in which the license is applied to the device 20 against will of an administrator who manages the device 20.

Any one of the above-described operations may be performed in various other ways, for example, in an order different from the one described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system comprising:
   circuitry configured to:
   in response to a request for using an application from an electronic device connected to the information processing system via a network, determine whether the requested application is applicable to the electronic device and is currently useable by the electronic device;
   based on a determination that the requested application is applicable to the electronic device but is not currently useable by the electronic device, determine whether a number of devices currently using the requested application has reached an upper limit number that is previously set; and
   allow the electronic device to use the requested application based on a determination that a number of devices using the requested application has not reached the upper limit number.

2. The information processing system of claim 1,
   wherein the circuitry determines whether a number of devices using the requested application has reached the upper limit number, based on a determination that a license for using the requested application is not currently applied to the electronic device, and
   applies the license to the electronic device to make the requested application to be useable by the electronic device, based on the determination that a number of devices using the requested application has not reached the upper limit number.

3. The information processing system of claim 2, further comprising:

a memory configured to store, for each one of a plurality of packages each including one or more applications, license information of a license for the package, the license information including device identification information identifying one or more electronic devices to which a license for using the one or more applications in the package is applicable, wherein, based on the determination that the number of devices using the requested application has not reached the upper limit number, the circuitry adds device identification information of the electronic device that requests for the requested application, to the license information for the package including the requested application that is stored in the memory, so as to apply the license.

4. The information processing system of claim 2, wherein, based on the determination that the number of devices using the requested application has not reached the upper limit number, the circuitry further authenticates a user of the electronic device and verifies authority of the user of the electronic device, and applies the license to the electronic device when the user is authenticated and the verified authority of the user is authority that application of the license is allowed.

5. The information processing system of claim 2, further comprising:

a display configured to display an error screen indicating that the requested application is unusable by the electronic device, based on a determination that the number of devices using the requested application has reached the upper limit number.

6. The information processing system of claim 5, further comprising:

the electronic device that requests for the requested application, the display being disposed at the electronic device.

7. The information processing system of claim 1, further comprising:

the electronic device that requests for the requested application, the electronic device being an image forming apparatus including a scanner, the requested application including an application that stores image data generated by the scanner in an external storage service.

8. The information processing system of claim 1, further comprising:

the electronic device that requests for the requested application, the electronic device being an image forming apparatus including a printer, the requested application including an application that prints electronic data downloaded from an external storage service using the printer.

9. An information processing apparatus comprising:

circuitry configured to:

in response to a request for using an application from an electronic device connected to the information processing apparatus via a network, determine whether the requested application is applicable to the electronic device and is currently useable by the electronic device, based on a determination that the requested application is applicable to the electronic device but is not currently useable by the electronic device, determine whether a number of devices currently using the requested application has reached an upper limit number that is previously set; and allow the electronic device to use the requested application based on a determination that a number of devices using the requested application has not reached the upper limit number.

10. An information processing method comprising:

receiving a request for using an application from an electronic device via a network;

determining whether the requested application is applicable to the electronic device and is currently useable by the electronic device;

determining whether a number of devices currently using the requested application has reached an upper limit number that is previously set, when the determining determines that the requested application is applicable to the electronic device but is not currently useable by the electronic device; and allowing the electronic device to use the requested application, when the determining determines that a number of devices using the requested application has not reached the upper limit number.

* * * * *